Figure 1:
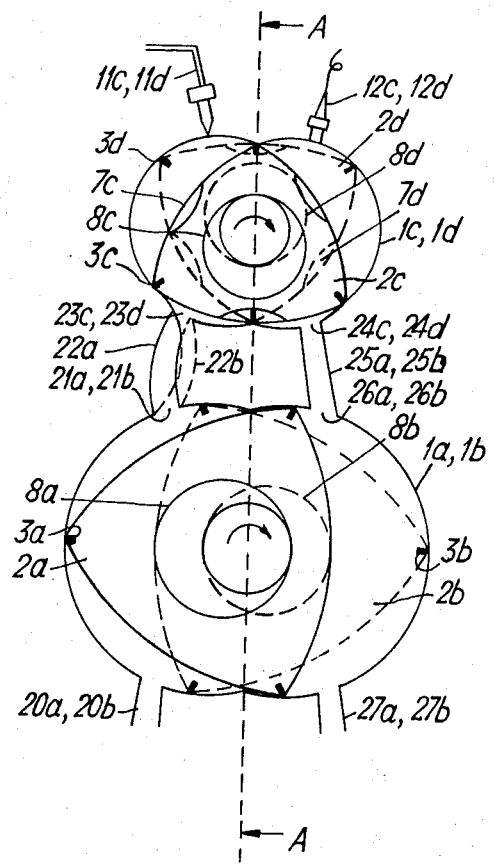

March 5, 1968   D. W. GARSIDE   3,371,654
COMPOUND ROTARY PISTON TYPE INTERNAL COMBUSTION ENGINE
Filed Oct. 31, 1966   4 Sheets-Sheet 1

Inventor
David Walker Garside
By
Cushman, Darby · Cushman
Attorneys

March 5, 1968   D. W. GARSIDE   3,371,654
COMPOUND ROTARY PISTON TYPE INTERNAL COMBUSTION ENGINE
Filed Oct. 31, 1966   4 Sheets-Sheet 2

Inventor
David Walker Garside
By
Cushman, Darby Cushman
Attorneys

March 5, 1968 D. W. GARSIDE 3,371,654
COMPOUND ROTARY PISTON TYPE INTERNAL COMBUSTION ENGINE
Filed Oct. 31, 1966 4 Sheets-Sheet 4

Inventor
David Wacker Garside
By Cushman, Darby & Cushman
Attorneys

United States Patent Office 3,371,654
Patented Mar. 5, 1968

3,371,654
COMPOUND ROTARY PISTON TYPE
INTERNAL COMBUSTION ENGINE
David Walker Garside, Sandbach, England, assignor to
Rolls-Royce Limited, Derby, England, a British company
Filed Oct. 31, 1966, Ser. No. 590,710
Claims priority, application Great Britain, Nov. 13, 1965,
48,299/65
6 Claims. (Cl. 123—8)

The present invention relates to rotary piston internal combustion engines.

Rotary piston engines of the type to which the invention relates employ a casing having a two-lobed epitrochoidal inner peripheral surface, a rotary shaft journalled in the casing and a three-sided rotary piston mounted on the rotary shaft eccentrically with respect thereto and geared to rotate in a planetary fashion at one third the speed of the shaft.

It is well known that in this type of engine it is difficult to achieve a high enough compression and expansion ratio to effect an efficient compression ignition cycle whilst still retaining a compact combustion chamber.

It is also known that one method of reducing this problem is to utilise two units of the above type of machine in a juxtaposed position whereby air is precompressed by the first and larger unit before being further compressed by the second or engine unit; and after initial expansion by the engine unit the exhaust gases are then returned to and further expanded by the first unit before being passed to atmosphere. Rotary piston engines of this type are set forth in our British patent specification No. 1,008,745, and in the Yanmar British patent specification No. 967,090.

However it is inevitable in the above types of engine that if the rotary pistons of the two units are so angularly related such as to effect an efficient compression phase then the angular relationship will be such that the efficiency of the expansion phase will be impaired, and vice versa. In practice a compromise has to be sought in the angular relationship of the two rotary pistons and this can then in addition introduce the possibility of leakage of gas from the expansion side to the compression side of the engine.

It is the object of the present invention therefore to increase the compression and expansion ratios of rotary piston type internal combustion engines without losing the advantage of a compact and efficient combustion chamber; and still further to achieve this whilst retaining both compression and expansion phases of high efficiency and ensuring that gas leakage is minimised.

To this end, according to the present invention, four such rotary piston engine units of which the first and second units are larger than the third and forth units are combined in such a manner that air or gas is drawn into the first unit, is then compressed between the rotary piston of this same first unit and the rotary piston of the fourth unit and their respective casings, and then further compressed in the fourth unit; after fuel has been injected and combustion has been initiated the gas is then expanded in the fourth unit before being further expanded between the rotary piston of this fourth unit and the rotary piston of the second unit and their respective casings and is finally ejected from the engine by the rotary piston of the second unit; and in addition air is drawn into the second unit and then compressed between the rotary pistons of the second and the third units and their respective casings, and then further compressed in the third unit; after fuel has been injected and combustion has been initiated the gas is then expanded in the third unit before being further expanded between the rotary pistons of the third and the first units and their respective casings and finally ejected from the engine by the rotary piston of the first unit.

In order to achieve the above it is essential that the rotary pistons of the four units are geared to run at the same rotational speed from which it follows that they will be in a fixed phase relationship to each other as will be later described.

The present invention will now be described with reference to the accompanying drawings which illustrate one embodiment of the engine.

Figure 2:
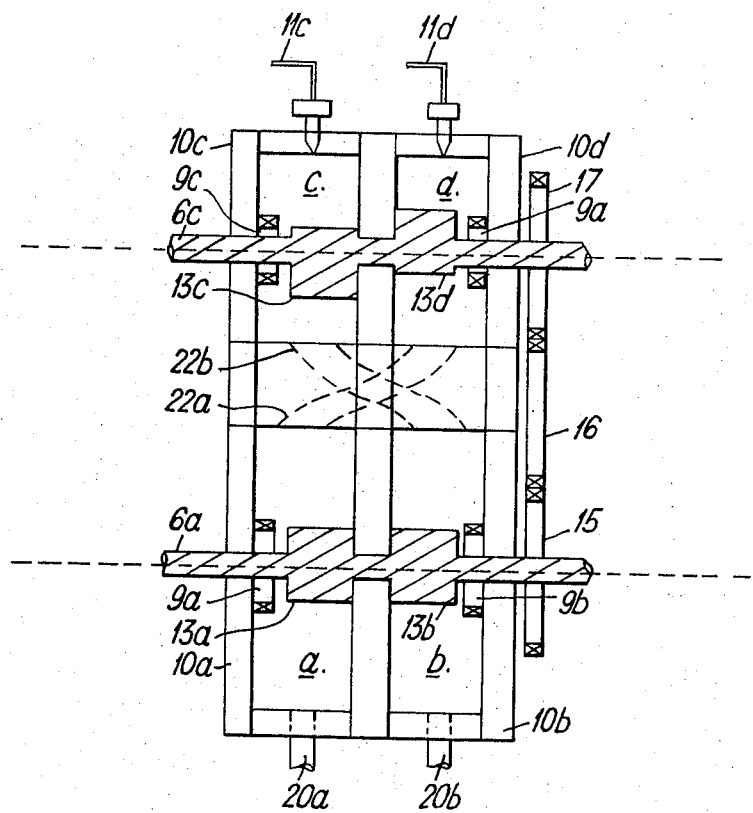

FIGURE 1 is a schematic view of the engine.
FIGURE 2 is a schematic cross section taken along lines A—A in FIGURE 1.
FIGURES 3 to 6 show the rotary pistons of the four units in four consecutive angular positions. For clarity the second and fourth units are shown at the side of the first and third units instead of being respectively co-axial as in an actual construction of the engine.

FIGURES 1 and 2 show the four units $a$, $b$, $c$, and $d$ each respectively comprising housings $1a$ and $1d$ which have inner peripheral walls of approximately two-lobed epitrochoidal configuration accommodating generally triangular rotary pistons $2a$ to $2d$ having edges with sealing elements $3a$ to $3d$ slidably contacting the inner wall. The pistons $2a$ to $2d$ are mounted on eccentric portions $13a$, $13b$ and $13c$, $13d$ of respectively two shafts $6a$ and $6c$. The rotary pistons $2c$ and $2d$ have recesses or depressions $7c$ and $7d$ provided in each of their three outer peripheral working surfaces. Indexing gears $8a$ to $8d$ and $9a$ to $9d$ mounted respectively on the rotary pistons $2a$ to $2d$ and on end plates $10a$ to $10d$ of the housings, cause the rotary pistons $2a$ to $2d$ to turn at one third of the speed of the shafts $6a$ and $6c$, the shafts $6a$ and $6c$ each being arranged to rotate at the same speed and in the same direction of rotation by means of gears 15, 16 and 17.

Fuel is supplied to each of the units $c$ and $d$ one or more injectors $11c$ and $11d$ and should it be desirable one or more spark plugs $12c$ and $12d$ may be provided.

An inlet port $20a$ allows air to enter the first rotary engine unit $a$ and a transfer passage $22a$ connects the outlet port $21a$ of this unit to the inlet port $23d$ of the fourth unit $d$. A transfer passage $25b$ connects the outlet port $24d$ of unit $d$ to a port $26b$ of unit $b$. An exhaust port $27b$ allows exhaust gas to pass from the unit $b$ to atmosphere. Similarly an inlet port $20b$ allows air to enter the second rotary engine unit $b$ and a transfer passage $22b$ connects the outlet port $21b$ of this unit to the inlet port $23c$ of the third unit $c$. A transfer passage $25a$ connects the outlet port $24c$ of unit $c$ to a port $26a$ of unit $a$. An exhaust port $27a$ allows exhaust gas to pass from the unit $a$ to atmosphere.

In order to ensure the efficient working of the engine it is necessary that the relative angular positions of the rotary pistons $2a$, $2b$, $2c$ and $2d$ are specially arranged and this is best achieved when the eccentrics $13b$, $13c$, and $13a$ lead eccentric $13d$ by respectively 90, 180 and 270 degrees of arc in the direction of rotation. Essentially therefore eccentrics $13a$ and $13b$ on shaft $6a$ are spaced 180 degrees apart, eccentrics $13c$ and $13d$ on shaft $6c$ are spaced 180 degrees apart and shaft $6a$ leads shaft $6c$ by 90 degrees. However this is not meant to exclude an engine wherein shaft $6a$ leads shaft $6c$ by an amount different to 90 degrees. For example shaft $6a$ may lead shaft $6c$ from approximately zero up to 180 degrees when the functioning of the engine will be fundamentally similar. One purpose of arranging for shaft $6a$ to lead shaft $6c$ by an amount different to 90 degrees would be to obtain an engine having a different expansion and compression ratio which is sometimes desirable.

Figure 3:
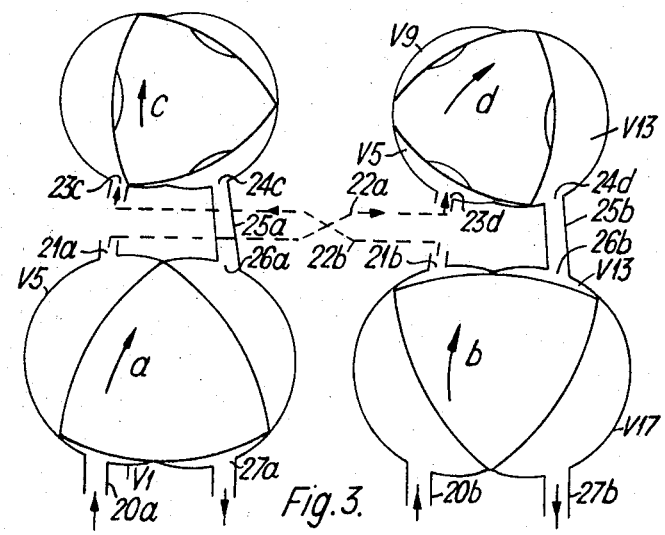
Figure 4:
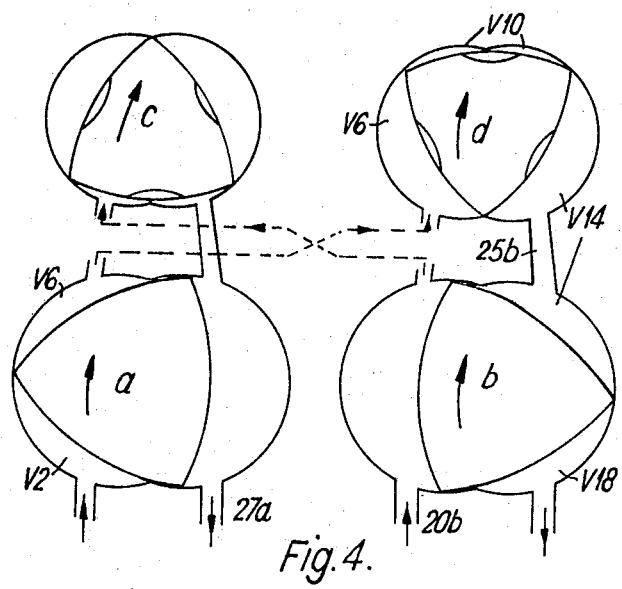
Figure 5:
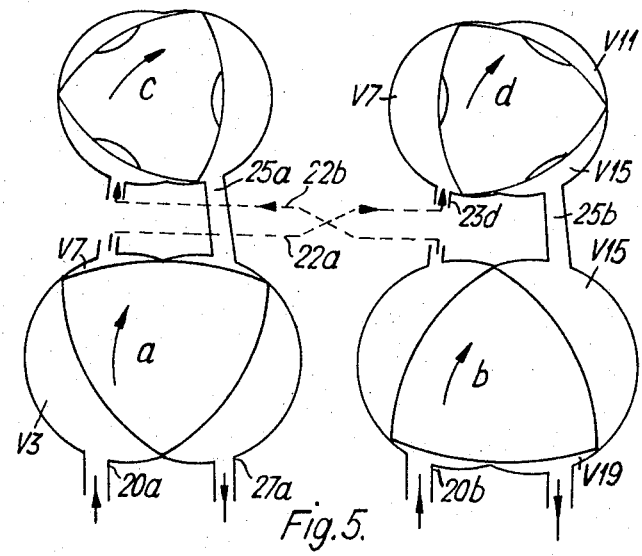
Figure 6:
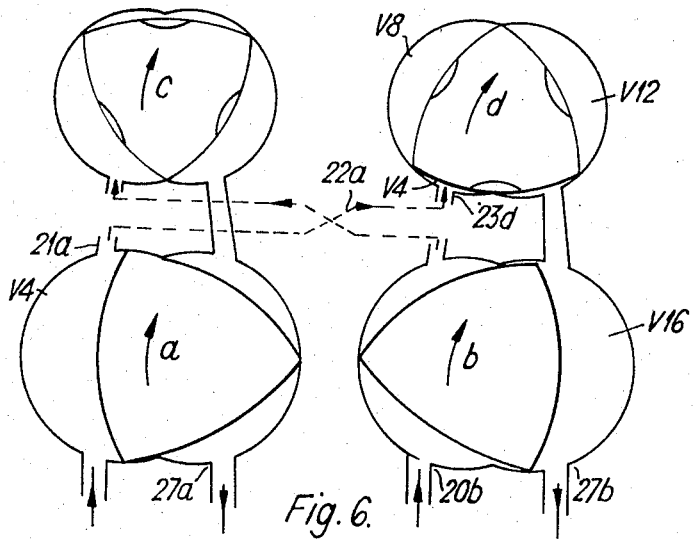

The operation of the engine according to the present invention will now be described with reference to FIG- URES 3 to 6 which show the rotary pistons having turned through successive 30 degree increments and the shafts upon which they are mounted through successive 90 degree increments. In FIGURE 3 air enters through port $20a$ to fill the expanding volume $V_1$. This volume increases to $V_2$ in FIGURE 4, to $V_3$ in FIGURE 5, and $V_4$ in FIGURE 6 by which time the port $21a$ has opened allowing air to pass to unit $d$ through port $23d$. The next stage is shown in FIGURE 3 again by which time port $20a$ has been closed and the volume of air under consideration is being compressed in the volume $V_5$. In FIGURE 4 the air is contained in volume $V_6$, and in FIGURE 5 in volume $V_7$ by which time the volume in unit $a$ is approaching a minimum and the port $23d$ is about to be closed. In FIGURE 6 the port $23d$ has been closed and all the air is contained in volume $V_8$ except for a small proportion which remains in the transfer passage $22a$, and for this reason the passage $22a$ must be arranged to be as short as possible. FIGURES 3, 4, 5, and 6 then successively show the unit $d$ acting as an internal combustion engine in the normal manner with fuel being injected and combustion initiated approximately when the air is contained in the volume $V_{10}$ of FIGURE 4 and the gas then expanding to volume $V_{11}$ of FIGURE 5 and volume $V_{12}$ of FIGURE 6. Port $24d$ is then opened allowing the gas to expand to volumes $V_{13}$, $V_{14}$, and $V_{15}$ of FIGURES 3, 4 and 5 respectively. FIGURE 6 shows the completion of this expansion in $V_{16}$ and the opening of the exhaust port $27b$. Volumes $V_{17}$, $V_{18}$ and $V_{19}$ of FIGURES 3, 4 and 5 respectively show the normal exhaust phase.

Similarly an identical cycle takes place whereby air is drawn in through port $20b$ of unit $b$, is compressed first between pistons $2b$, and $2c$ and their respective housings and then in unit $c$; after fuel has been injected and combustion has been initiated, the gas expands first in unit $c$ and then between pistons $2c$ and $2a$ and their respective housings before being exhausted through the port $27a$, this sequence taking place at a time which is 180 degrees of crank angle out of phase with the first cycle described.

In the engine described above the short transfer passages $25a$ and $25b$ are used for transfer of the hot expanding exhaust gases and the longer transfer passages $22a$ and $22b$ are used for transfer of the cooler ingoing air. However this is not meant to exclude an engine wherein these functions are reversed as could for instance be essentially achieved by reversing the direction of rotation of the engine as described above.

I claim:

1. A compound rotary piston internal combustion engine comprising four juxtaposed rotary piston units each including a casing having a two-lobed substantially epitrochoidal inner peripheral surface, a rotary shaft, an eccentric mounted on the rotary shaft, a three-sided rotary piston arranged to rotate in a planetary fashion about the eccentric within the two-lobed casing and gearing to constrain the rotary piston to rotate at one third of the speed of the rotary shaft, the first and second units being of equal size but larger than the third and fourth units which are also of equal size; and further gearing to constrain the rotary pistons of all four units to rotate at the same speed; the arrangement being such that gas is drawn into the engine by the first rotary piston unit, is then initially compressed between the rotary pistons of the first and fourth units and their respective casings, is then further compressed in the fourth unit and, after combustion has been initiated, is then expanded by the rotary piston of the fourth unit and is then further expanded between the rotary pistons of the fourth and second units and their respective casings before being exhausted to atmosphere by the rotary piston of the second unit, and further, that gas is drawn into the engine by the second rotary piston unit, is then initially compressed between the rotary pistons of the second and third units and their respective casings, is then further compressed in the third unit and, after combustion has been initiated, is then expanded by the rotary piston of the third unit and is then further expanded between the rotary pistons of the third and first units and their respective casings before being exhausted to atmosphere by the rotary piston of the first unit.

2. A compound rotary piston internal combustion engine as claimed in claim 1 and in which the first and second rotary piston units have a common rotary shaft and the third and fourth rotary piston units also have a common rotary shaft.

3. A compound rotary piston internal combustion engine as claimed in claim 2 and in which the eccentrics on the common shaft of the first and second rotary piston units are angularly spaced by 180 degrees, and the eccentrics on the common shaft of the third and fourth rotary piston units are angularly spaced by 180 degrees, and the eccentrics of the first and second rotary piston units lead the eccentrics of the third and fourth rotary piston units respectively by from approximately zero to 180 degrees.

4. A compound rotary piston internal combustion engine as claimed in claim 1 and in which the first rotary piston is in the same plane as the third and the second rotary piston is in the same plane as the fourth.

5. A compound rotary piston internal combustion engine as claimed in claim 1 and in which the units each have peripheral ports and in which there are provided transfer passages interconnecting the ports so that the gases may be transferred between the larger units and the smaller units.

6. A compound rotary piston internal combustion engine according to claim 5 and in which short transfer passages are employed to transfer the hot expanding gases and longer transfer passages are employed to transfer the cooler ingoing air.

References Cited

UNITED STATES PATENTS

| 3,139,722 | 7/1964 | Yokoi | 123—8 X |
| 3,228,183 | 1/1966 | Feller | 60—15 |
| 3,236,213 | 2/1966 | Yokoi | 123—8 |

RALPH D. BLAKESLEE, *Primary Examiner.*